Dec. 16, 1958 T. W. MARTINEK 2,864,594
MIXING DEVICE
Filed Dec. 7, 1953 5 Sheets-Sheet 1

INVENTOR.
BY THOMAS W. MARTINEK
ATTORNEY.

Dec. 16, 1958  T. W. MARTINEK  2,864,594
MIXING DEVICE

Filed Dec. 7, 1953  5 Sheets-Sheet 2

INVENTOR.
BY THOMAS W. MARTINEK
ATTORNEY.

INVENTOR.
BY THOMAS W. MARTINEK
ATTORNEY.

INVENTOR.
BY THOMAS W. MARTINEK
ATTORNEY.

Dec. 16, 1958 T. W. MARTINEK 2,864,594
MIXING DEVICE
Filed Dec. 7, 1953 5 Sheets-Sheet 5

INVENTOR.
BY THOMAS W. MARTINEK
ATTORNEY.

United States Patent Office 2,864,594
Patented Dec. 16, 1958

2,864,594

MIXING DEVICE

Thomas W. Martinek, Crystal Lake, Ill., assignor to The Pure Oil Company, Chicago, Ill., a corporation of Ohio Application December 7, 1953, Serial No. 396,497

12 Claims. (Cl. 259—105)

The present invention relates to a mixing device designed for both high speed-light duty and low speed-heavy duty mixing which is characterized by a particular counter-rotating interconnected pinion-bevel gear arrangement between the rotating blades.

Various designs of counter-rotating blades are known in the art including concentric opposite rotating shafts wherein the counter-rotation is limited to the locale of the shaft ends as in United States Patent 88,016, dated March 23, 1869, and embodiments wherein the counter-rotation is between vertical suspended blades and a rotating container wall. In still another type of mixer counter-rotation is accomplished by suspending alternate blades on independent cooperating shaft and bracket arrangements, as described in United States Patent 297,047, dated April 15, 1884. These double motion agitators are efficient as pressure mixers and grease mixers with outer sweep and scraper arms rotating in one direction and alternate paddles revolving in the opposite direction. It is also known to arrange the paddles so that one set is pitched to lift the materials being mixed while the other set is pitched to force the materials downwardly. As the paddles pass each other, they cooperate to produce a rubbing, kneading, and shearing action which effectuates thorough mixing and homogeneity of product. The efficiency of heating or cooling action is also accelerated by these prior art designs. However, so far as it is known, none of the prior art mixers provide counter-agitation under conditions necessary in both high speed-light duty mixing and low speed-heavy duty mixing in one device. Further, the prior art mixers do not provide an assembly of cooperating blades wherein the number of agitators may be readily varied or their respective alternate speeds of rotation changed or varied over considerable ranges without turning to a completely different assembly or without complex mechanical changes.

The present invention comprises a device providing a series of alternate counter-rotating agitator blades or impellers rotating around a single stationary shaft which may be affixed to a source of motive power for use anywhere or extending within a mixing vessel. The hubs of the impellers are separated from each other by separate collars which slideably but non-rotatably encircle the shaft. The diametrically opposite hub ends of each successive pair of hubs carry peripheral gears or ring gears which engage in one or more spur gears or bevel gears carried on each spacing collar. Each spur gear is rotatably mounted on a shaft affixed to a collar so that the spur gear can mesh with the peripheral gears of the hubs in juxtaposition therewith. Where straight or bevel gears are employed, the axis of rotation of each hub must necessarily be substantially vertical to the axis of its associated spur gear. By this arrangement, the application of a driving force to the end or topmost impeller hub is transmitted to each successive hub in the series in such a manner that they are alternately reversed in direction of rotation. The arrangement forms a differential gear system in the form of a modified epicyclic train of straight or bevel gears for connecting adjacent hubs in the same axial line. Where the assembly is mounted on a vertical fixed axis, each impeller will rotate about that vertical fixed axis and each sungear will rotate on a horizontal axis. By providing peripheral gears or ring gears of different diameters on opposing hubs, the rate of rotation may be changed from one agitator blade to the next. Each part is designed for easy disassembly for changing the type of blade, the degree of shearing action, the number of blades or the relative speed ratio desired.

In one particular embodiment of the invention, the peripheral gears or ring gears on the agitator blade hubs are spring loaded so that under extreme torque caused by accidental fouling of the blades, the gears will be allowed to compress or move along their axis of rotation and thus disengage. By providing a series of such spring loaded gears in the various hubs, the relative clearance between opposite blade edges can be adjusted or varied and thus increase or decrease the shearing action obtained as desired.

Accordingly, it is the primary object of this invention to provide a mixing device designed for both high speed-light duty mixing and low speed-heavy duty mixing.

A second object of this invention is to provide in a mixing device a differential action between agitator blades about a fixed inner shaft.

A third object of this invention is to provide an agitator blade assembly to give alternate counter-rotation of a series of blades throughout the mixing volume without the necessity of brackets which impede the mixing efficiency.

A fourth object of this invention is to provide a mechanical arrangement of interconnecting agitator blade hubs and sungear assemblies in a mixing device whereby efficient counter-rotation is attained.

A fifth object is the provision of means for varying the speed rates of one or more respective alternate rotating blades in a mixing device.

A sixth object is to provide spring-loaded splined gears interconnecting sun or pinion gears on fixed shafts so that the accidental jamming of one or more blades will not cause breakage of the assembly.

A seventh object of the invention is to provide a mixing device which is readily dismantled, assembled and repaired.

An eighth object of the invention is to provide means whereby the shearing action between the successive agitator blades may be varied or changed as the necessity therefor may be dictated by the progress of the chemical or physical action of the materials being agitated.

Other objects and advantages of the invention will become apparent as the description thereof proceeds to include spring-loaded splined ring gear sleeves, slideable collars for spur or bevel gears, varying gear ratios between hub assemblies, readily detachable brackets, provision for compression and expansion of a series of blades, and easily removable assemblies as refinements of the differential action between assemblies about a fixed inner shaft and by reference to the drawings wherein.

Figure 1:
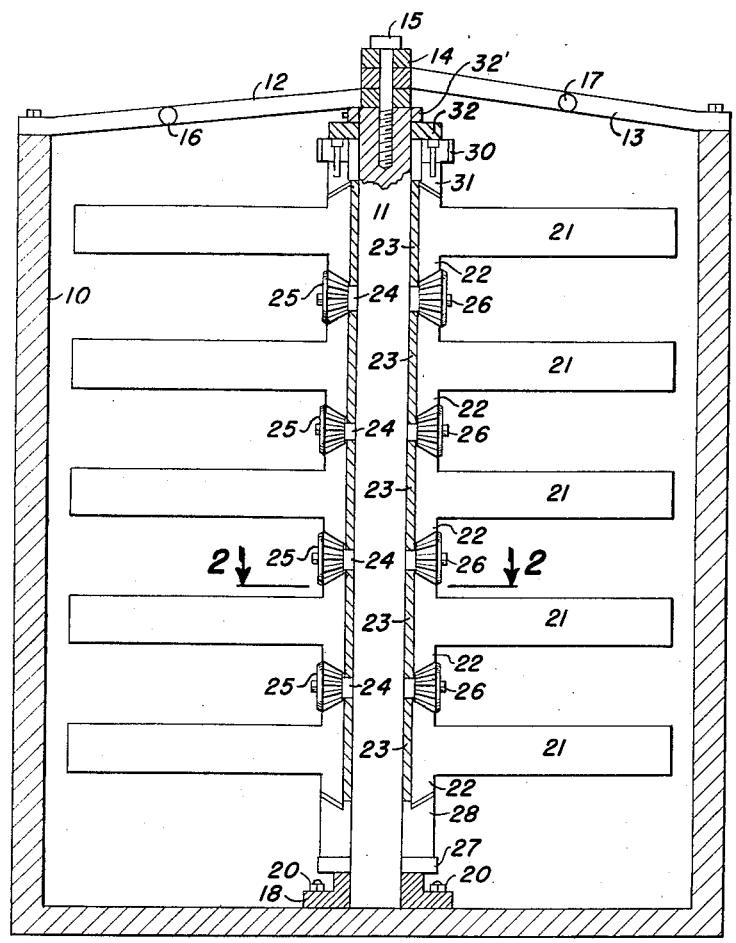
Figure 1 is a partial cross-sectional view of a mixing vessel provided with the simplest form of interconnecting agitator blade hubs and associated bevel gears mounted on spacing collars in a single fixed shaft.
Figure 2:
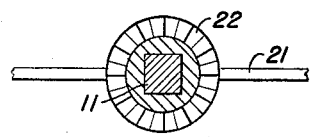
Figure 2 is a cross-sectional view of a portion of the apparatus taken along lines 2—2 of Figure 1.

Referring to Figure 1, the mixing vessel is represented by numeral 10 and may be any form of container in which materials are mixed or reacted. The drawing shows an industrial mixing vat or kettle in which event various means not shown would be provided for heating, cooling and transferring the contents during various stages of processing. For instance in such a device a cover would be provided and, if desired, means for maintaining an inert atmosphere over the contents of the vessel and for maintaining particular temperature conditions. For simplicity, vessel 10 is represented as a straight sided, flat bottomed vat designed to confine the materials to be treated. Vessel 10 is fitted with a fixed shaft 11 comprising the principal means for supporting the agitator blades and other cooperating parts. Shaft 11 is preferably of irregular cross-section to facilitate the placement of certain parts thereon in non-rotating relationship, yet in a manner which allows their placement and removal by sliding up and down the shaft. For this purpose, shaft 11 is made either square, hexagonal, or octagonal in cross-section.

To hold shaft 11 in non-rotating rigid position, a bracket arrangement is provided at the top and bottom of the vessel. At the top of vessel 10, a plurality of bracket arms 12, 13, and 14 are located extending from the top rim to the end of shaft 11. Three bracket arms like 12–14 are sufficient to hold the shaft and center the top thereof within the vessel. Bolt 15 passes through holes in the ends of the brackets into threaded recesses in the end of shaft 11 to provide ready means for releasing all brackets at once. The brackets may be hinged or clamped to the sides of vessel 10 or hinged at their mid points as at 16 and 17 so they can be swung aside during removal of the stirring assembly.

At the bottom of the vessel 10, a stationary flange 18 is held by bolts 20. Flange 18 has a recess conforming to the contour of the outside of shaft 11 to hold the latter in non-rotating relationship. Means may be provided within flange 18 for holding shaft 11 against the lifting force of the agitator blades, such as a shear pin or the like, not shown.

A plurality of agitators having blade members 21 and hub members 22 are carried by shaft 11. The aperture through each hub is larger than the shaft 11 and each hub is fitted with a sleeve as at 23, which fits shaft 11 in non-rotating relationship, but is free to slide vertically thereon for easy removal. The hubs and sleeves may be made as separable pieces for easy removal for repair and cleaning. In one form, each sleeve may be permanently journaled to its respective hub so these parts are removable as a unit.

The bottom and top peripheral edge of each hub 22 has bevel gear teeth cut therein. Between each pair of hubs is a collar 24 carrying one or more bevel gears 25 on shafts 26. The collars 24 are shown carrying two bevel gears which have their axis at 180° from each other. The collars 24 have apertures which conform with the outer shape of shaft 11 so as to fit in a slideable, but non-rotatable manner. Shafts 26 may be threaded to engage tapped holes in the collars. Any other means of attachment may be used, as long as the bevel gears are rotatably held on a fixed axis perpendicular to the axis of rotation of the agitator blades. The entire assembly is carried by flange 18 and thrust bearing 27 through the adapter 28. The thrust bearing 27 may be of any type suitable for this purpose. The adapter 28 is cut at the top to conform to the geared end of the train, engages the gear teeth of the bottom hub and rotates therewith. This construction forms a continuous surface at the end of the train for contact with the thrust bearing 27.

Motive power is supplied to the train through the sprocket or gear 30, which may be bolted, welded to, or made a part of the adapter 31 meshed with the topmost hub 22. The thrust bearing 32, held in place by collar 32', holds the adapter 31 and attached sprocket or gear 30 in meshed position with the hub 22. Sprocket 30, adapter 31, and top hub 22 rotate together.

It is readily seen that on rotation of sprocket 31 and topmost hub 22 in one direction, topmost bevel gear 25 will cause the next hub 22 to rotate in the opposite direction and so on down the series of blades.

Figure 3:
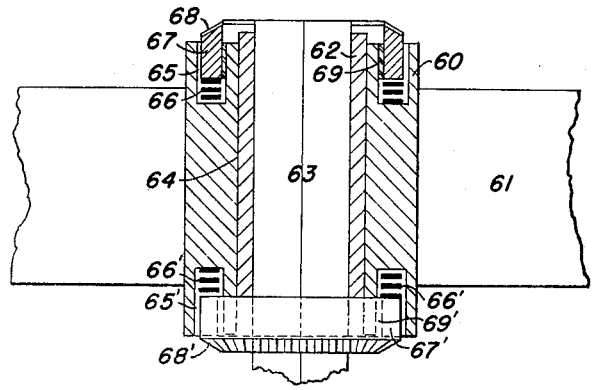
Figure 3 is a partial cross-sectional view of a spring loaded splined ring gears fitted within a hub.
Figure 4:
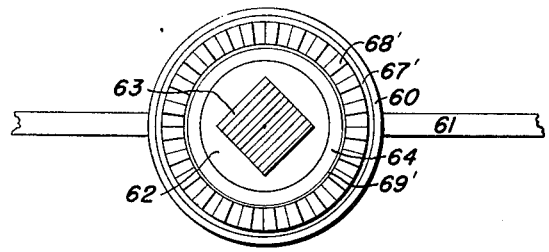
Figure 4 is an end view of Figure 3.

In Figures 3 and 4 there is shown another form of hub 60 carrying blade 61 with sleeve 62 fitting in slideable but non-rotatable relationship with shaft 63, the latter being square in cross-section. Sleeve 62 acts as a bearing along surface 64 for hub 60. Recesses 65 and 65' within the top and bottom peripheral edges of hub 60 carry coil springs 66 and 66' and ring gears 67 and 67', having bevel gear teeth at 68 and 68'. Preferably, coil springs 66 and 66' and ring gears 67 and 67' are individual elements to facilitate cleaning and replacement. The springs and associated ring gears may be welded or otherwise attached to each other at the surface of contact to facilitate assembly and disassembly. The ring gears must be free to slide back and forth within the recesses along the axis of shaft 63 under pressure from the weight of the hub or series of similar hubs in the assembly, while at the same time being held in non-rotating relationship with hub 60. For this purpose, the ring gears 67 and 67' are splined to hub 60. This is shown at 69 and 69'. Hub 60 as shown in Figure 3 is assembled in a form for use in an intermediate position between opposing bevel gears and other associated hubs in the series and needs no adapter at the top or bottom. The top and bottom hubs would be assembled by removing the ring gear on the end adjacent the thrust bearings. The bevel gears meshing with the ring gear 67 are not shown in Figure 3. The spring-loaded splined sleeves as shown in Figure 3 may be used in conjunction with floating collars for the bevel gear assembly as collars 24 in Figure 1 or either of these individual improvements may be used alone in making up a stirring assembly.

Figure 5:
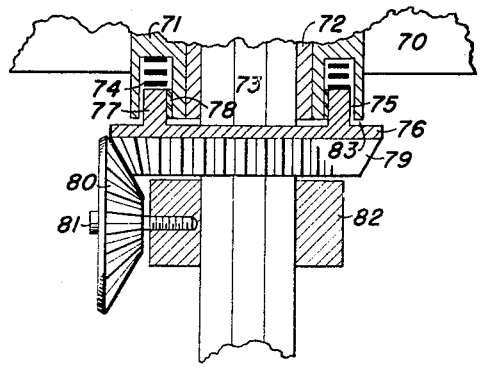
Figure 5 is another sectional view of a single hub and associated separating collar carrying a bevel gear wherein a different form of spring and ring gear are used.

Figure 5 is a cross-sectional view of another form of hub and bevel gear assembly contemplated by this invention. Blade 70 and hub 71 are fitted in rotational relationship on sleeve 72 which is slideably mounted on octagon shaft 73. Spring 74 fits within recess 75 of circular splined hub 71. Spring 74 is shown as a coil ribbon spring free to flex within the recess. Bevel ring gear 76 has integral collar 77 splined within recess 75 as at 78 to engage the splined hub 71, and has bevel gears 79 which mesh with bevel gear 80 carried on shaft 81 by collar 82. Under compression due to excess torque bevel ring gear 76 can move upwardly until the teeth 79 slide over the teeth of the bevel gear 80, which distance may be represented by the spacing 83 between the top of bevel ring gear 76 and the bottom of hub 71 and sleeve 72. The distance over which gear 76 can travel may be varied by change of dimensions in the parts whereby a series of interconnected hubs like 71 may be moved or compressed by the application or release of the holding force and thus bring the edges of the corresponding blades closer to each other or further apart to increase or decrease the shearing action therebetween.

Figure 6:
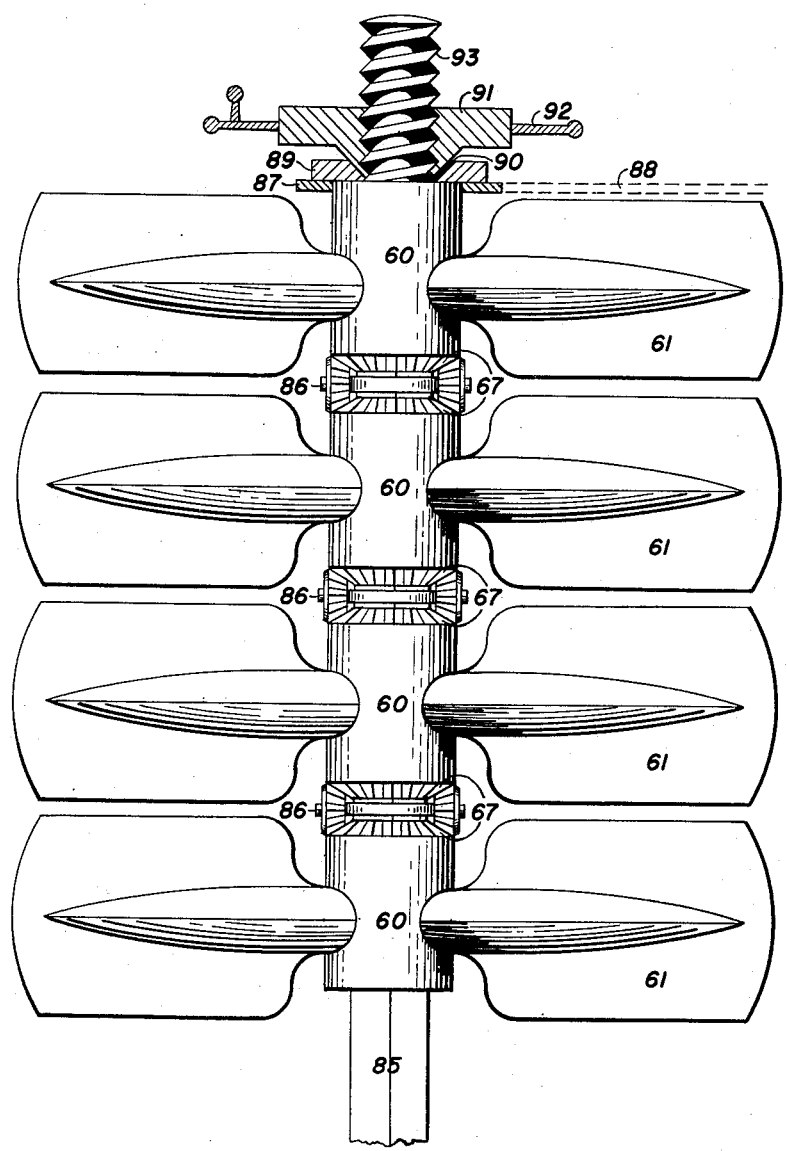
Figure 6 shows an entire assembly with a plurality of splined spring loaded ring gear hubs and an arrangement for adjusting the spacing and shear between the blades.

This is more clearly shown in Figure 6 wherein one form of multiple blade assembly with interconnecting modified epicyclic gear train is shown, with portions thereof in cross-section. In Figure 6, the series of blades 61, like those shown in Figures 3 and 4, having hubs 60 carried on shaft 85 are connected by their respective spring-loaded ring gears 67 and bevel gears 86. The drive mechanism is represented by sprocket 87 and chain 88. Thrust bearing 89 has conical inner surface 90 into which impinges the opposing surface of screw wheel 91. Screw wheel 91 has handles 92 to aid in turning same on threads 93 of fixed square shaft 85, the downward motion of which causes the compression of the successive hubs closer together through the spring-loaded ring gears 67. By varying the relative compression strength of the springs used, it is possible to produce the greatest shear near the bottom or top of the vessel as desired.

Figure 7:
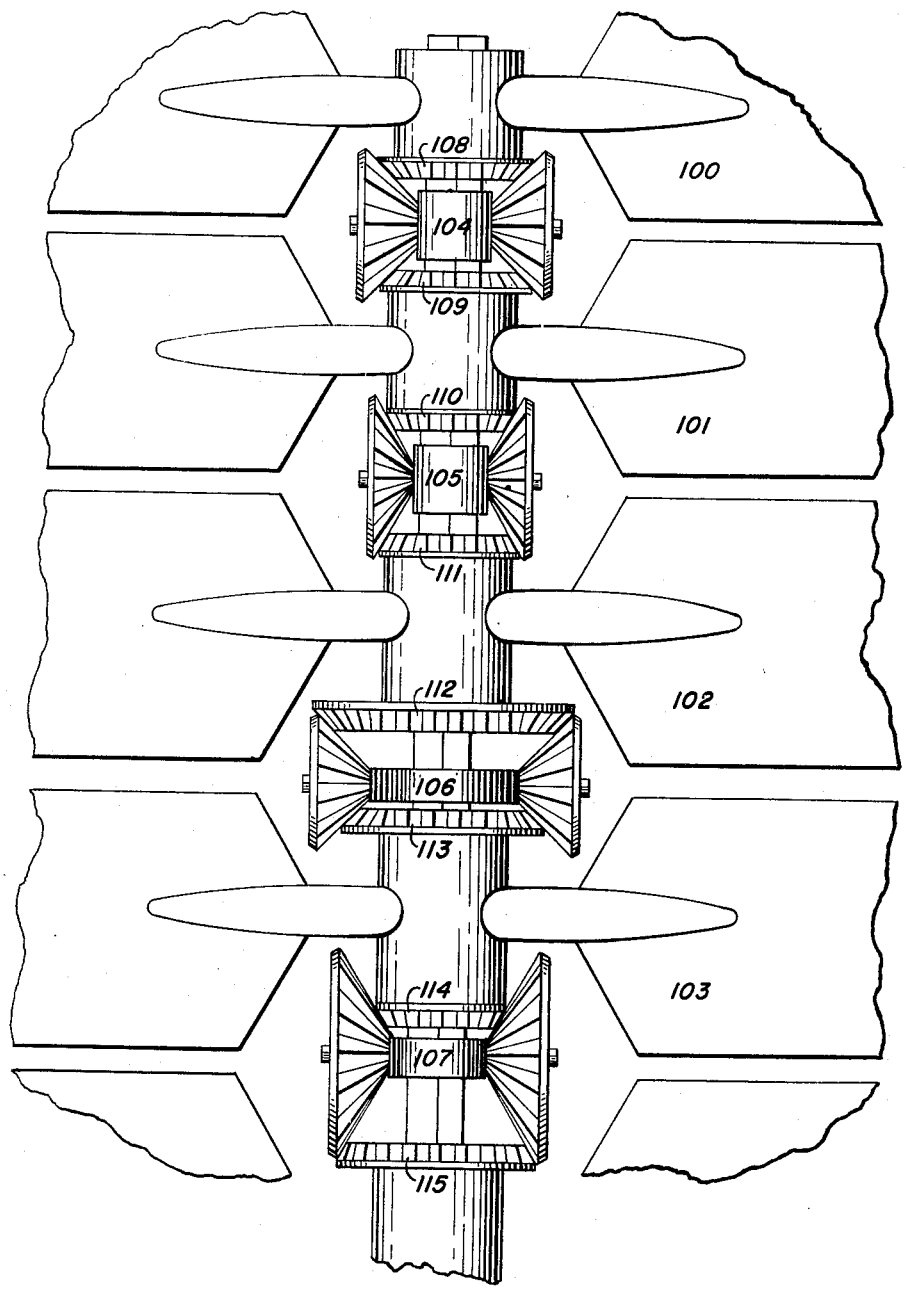
Figure 7 shows the interconnection of several adjacent hubs having a bevel or box gear arrangement whereby the speed of rotation is varied throughout the series.

In Figure 7, there is shown the arrangement of a series of agitator blades 100, 101, 102, and 103 having their respective ring gears meshing with a series of double bevel gears-collar assemblies 104—107 whereby a positive change in speed of rotation between successive blades is attained. Thus, ring gears 108 and 109 being of the same diameter will cause blades 100 and 101 to rotate at the same speed but, of course, in opposite directions. Ring gear 110, being smaller than 111, will cause blade 102 to rotate slower than blade 101, let us say 10 R. P. M. This would mean that ring gear 112 is also rotating at 10 R. P. M., but being of larger diameter will cause bevel gears 106 to rotate relatively fast, at, say, 40 R. P. M. and cause ring gear 113 and blade 103 to rotate at 30 R. P. M. Since ring gear 114 is small compared with 113 and both bevel gears 107 and ring gear 115 are relatively large, the bottom blade will rotate slowly.

Figure 8:
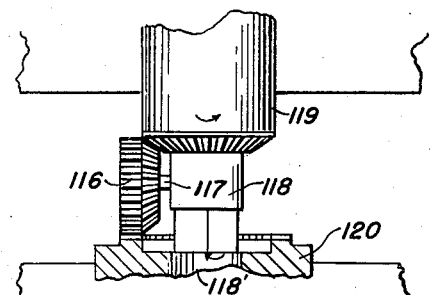
Figure 8 is a view showing two consecutive hubs geared together through a bevel gear and spur gear combination operating on corresponding ring gears.
Figure 9:
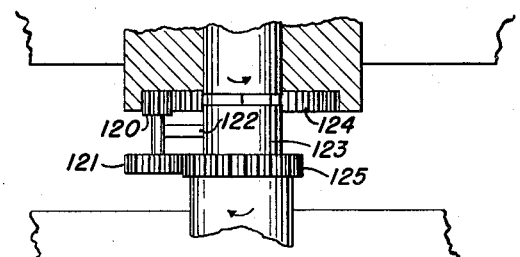
Figure 9 shows the use of a twin spur gear arrangement to increase the speed of rotation of the lower hub.
Figure 10:
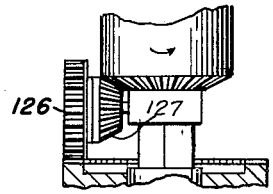
Figure 10 shows two consecutive hubs geared together through a bevel gear combination and a spur gear of larger diameter engaging a ring gear.
Figure 11:
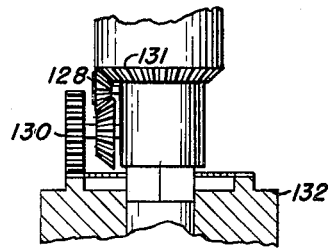
Figure 11 is a similar arrangement to Figure 10 in which the speed of rotation of the lower hub is decreased but the direction of rotation is the same as the upper hub.

Figures 8, 9, 10, and 11 are partial views of other gearing arrangements that may be used between successive blade hubs. In Figure 8 combination spur and bevel gear 116 is rotatably mounted on shaft 117 affixed to non-rotatable collar 118 and meshes with the bevel gear of hub 119 and the ring gear of hub 120. In Figure 9, two small spur gears 120 and 121 are rotated on a vertical axle which is connected by bracket 122 to collar 123. Spur gear 120 engages ring gear 124 while spur gear 121 engages ring gear 125. Ring gear 125 will rotate in the opposite direction from gear 124. Figure 10 is a modification of the embodiment shown in Figure 8 giving a greater speed reduction through the use of a larger spur gear engaging the ring gear on hub 120 and a smaller bevel gear engaging the bevel gear of hub 119. In Figure 11 the use of idler gear 128 between the spur gear 130 and ring gear 131 causes ring gear 132 to rotate in the same direction as ring gear 131, but at a slower speed.

The assemblies shown in the figures obviously may carry the motive power directly attached to the end of the shaft to make a portable unit which is easily utilized for various mixing operations. Such a portable unit would have in combination the motive power, the fixed shaft, the plurality of agitator blades with or without spring-loaded splined hub assemblies which are held upon the shaft as a unit so that the entire assembly may be readily moved about or used as desired. With such a portable unit, the stationary flange 18 shown attached to the bottom center of the mixing vat in Figure 1 would not be used and shaft 11 would be fitted with means to hold the assembled agitator blades and bevel gears thereon. Also, bracket arms 12 to 14 would not be needed. In such a portable unit the agitator blades and floating gear assemblies would slide up onto the shaft from the bottom to their proper positions. The portable device would be somewhat limited in its applications because of the fact that the lower end of the shaft is not supported.

What is claimed is:

1. A mixing device comprising a vessel to hold materials to be mixed, a fixed shaft within said vessel, a series of two or more spaced agitator blades mounted on hubs encircling said shaft, bearing means between said hubs and said shaft, said hubs having opposed spaced spring-loaded gear surfaces, a series of non-rotatable slideable collars between said spaced hubs on said shaft, said collars carrying floating gears rotatably mounted on an axle perpendicular to said shaft and meshing with said geared surfaces on said hubs to form a floating gear train therebetween, so that rotation of one hub and blade causes the next succeeding hub and blade to rotate in the opposite direction, said springs in said spring-loaded gear surfaces being of different compression strength along said floating gear train, and means for compressing said bearings and hubs together against said springs to increase the shear between said agitator blades.

2. In a mixing device the combination including a series of agitator blades extending from spaced rotatable hubs on a fixed shaft, means for rotating one of the hubs in the series, floating gear trains connected between adjacent hubs comprising a first ring gear on one of said agitator blade hubs, a spur gear in engagement therewith, said spur gear being supported on a rotatable axis parallel and spaced from said fixed shaft, a second spur gear on said axis, said second spur gear being in engagement with a ring gear on the adjacent agitator blade hub.

3. In a mixing device the combination including a series of agitator blades extending from spaced rotatable hubs on a fixed shaft, means for rotating one of the hubs in the series, floating gear trains connected between adjacent hubs comprising an internal ring gear on one of said agitator blade hubs, a spur gear in engagement therewith, said spur gear being supported on a rotatable axis parallel and spaced from said fixed shaft, a second spur gear on said axis, said second spur gear being in engagement with a ring gear on the adjacent agitator blade hub and said second ring gear being of smaller diameter than said first ring gear.

4. A mixing device comprising a vessel to hold materials to be mixed, a fixed shaft within said vessel, at least two spaced agitator blades rotatably mounted on hubs encircling said shaft, said hubs having peripheral spring loaded gear surfaces at their spaced opposed ends, a series of collars between said spaced hubs, said collars being slideably and non-rotatably mounted on said shaft, said collars carrying rotatable floating gears, said floating gears meshing with the adjacent peripheral gear surfaces of opposed hubs to form a floating gear train along said shaft so that rotation of one hub and blade in the series causes the opposite rotation of the next succeeding hub and blade, means for compressing said hubs together against said spring-loaded gear surfaces to increase the shear between said agitator blades and means for rotating one of said hubs in the series.

5. A mixing device in accordance with claim 4 in which each of said peripheral gears has a tubular body portion encircling said shaft in spaced relationship and extending from the gear surface thereof, each of said hubs has an annular recess in the ends thereof to receive said body portions of said peripheral gears in a sliding relationship and an annular spring is positioned within each of said recesses to engage the body portions of said peripheral gears.

6. A mixing device comprising, in combination, a walled vessel, a fixed shaft within and spaced from the walls of said vessel, a series of agitator blades extending from spaced rotatable hubs on said shaft, means for rotating one of the hubs in the series, opposed peripheral spring-loaded ring gears on the ends of said hubs, a non-rotatable collar on said shaft between each of said hubs, at least one axle attached to each collar, said axles being positioned perpendicular to said shaft, a spur gear on each of said axles, said spur gears meshing with the opposed ring gears of adjacent hubs, said hubs and collars being slidably mounted on said shaft, means for holding said hubs and collars one upon the other in the series, said spring-loaded ring gears urging said hubs and agitator blades apart from one another, means for rotating one of said hubs about said shaft, and means for moving said hubs closer together against said spring-loaded ring gears to control the clearance and shear between the adjacent agitator blades.

7. A mixing device in accordance with claim 6 in which one end of said shaft is fixed to a wall of said vessel, and said means to move said hubs comprises a wheel member engaging the threaded opposite end of said shaft whereby rotation of said wheel in one direction presses same against the top-most hub in the series and compresses said spring-loaded gears thereby bringing said blades in closer proximity to one another.

8. A mixing device comprising, in combination, a walled vessel, a fixed shaft within and spaced from the walls of said vessel, a series of agitator blades extending from spaced rotatable hubs on said shaft, means for rotating one of the hubs in the series, opposed peripheral spring-loaded ring gears on the ends of each of said hubs, the compression strengths of the springs being different along the series of hubs, a non-rotatable collar on said shaft between each of said hubs, at least one axle attached to each collar, said axles being positioned perpendicular to said shaft, a spur gear on each of said axles, said spur gears meshing with the opposed ring gears of adjacent hubs, said hubs and collars being slideably mounted on said shaft, means for holding said hubs and collars one upon the other in the series, said spring-loaded ring gears urging said hubs and agitator blades apart from one another, means for rotating one of said hubs about said shaft, and means for moving said hubs closer together against said spring-loaded ring gears to control the clearance and shear between the adjacent agitator blades in accordance with the relative differences in compression strength of said springs.

9. In a mixing device the combination including a series of agitator blades extending from spaced rotatable hubs on a fixed shaft, means for rotating one of the hubs in the series, floating gear trains connected between adjacent spaced hubs comprising a series of individual pairs of bevel gears each rotatably mounted on an axis positioned normal to said fixed shaft, said bevel gears in each pair being on opposite sides of said fixed shaft and each gear engaging opposed spaced bevel gears attached to said hubs, and said bevel gears along the series and said bevel gears attached to said hubs are of different diameters whereby the relative speeds of rotation of the series of agitator blades upon rotation of one agitator blade in the series is changed.

10. In a mixing device the combination including a series of agitator blades extending from spaced rotatable hubs on a fixed shaft, means for rotating one of the hubs in the series, floating gear trains connected between adjacent spaced hubs comprising a first ring gear on one of said agitator blade hubs, a spur gear in engagement therewith, said spur gear being supported on a rotatable axis parallel and spaced from said fixed shaft, a second spur gear on said axis, said second spur gear being in engagement with a second ring gear on the adjacent agitator blade hub, whereby the rotation of one blade in the series causes the rotation of each adjacent blade in the series in an opposite direction.

11. A mixing device in accordance with claim 10 in which said first ring gear is an internal ring gear and said second ring gear is an external ring gear.

12. In a mixing device the combination including a series of agitator blades extending from spaced rotatable hubs on a fixed shaft, means for rotating one of the hubs in the series, said hubs having peripheral gear surfaces at their spaced opposed ends, a series of collars between said spaced hubs, said collars being slideably and non-rotatably mounted on said shaft, at least one of said collars supporting two parallel axles mounted perpendicular to said shaft, the first of said axles rotatably supporting an idler gear, the second of said axles rotatably supporting a first driven gear, a second driven gear attached to said first driven gear on said second axle, said second driven gear engaging the peripheral gear surface of the adjacent hub, so that at least one pair of hubs and associated blades in the series rotate in the same direction at different speeds.

References Cited in the file of this patent

UNITED STATES PATENTS

| | | |
|---|---|---|
| 28,560 | Cheever | June 5, 1860 |
| 88,016 | Deuel | Mar. 23, 1869 |
| 194,145 | Greene | Aug. 14, 1877 |
| 297,047 | Wilkes | Apr. 15, 1884 |
| 465,327 | Mulford | Dec. 15, 1891 |
| 653,056 | Baker | July 3, 1900 |
| 925,652 | Rippy | June 22, 1909 |
| 1,074,728 | Preston | Aug. 19, 1913 |
| 1,500,807 | Flanigan | July 8, 1924 |
| 1,856,443 | Stoeckicht | May 3, 1932 |
| 1,966,382 | Donohue | July 10, 1934 |
| 1,981,531 | Van Woert | Nov. 20, 1934 |
| 2,552,023 | Anderson | May 8, 1951 |
| 2,573,140 | Heth | Oct. 30, 1951 |

FOREIGN PATENTS

| | | |
|---|---|---|
| 172,298 | Switzerland | Oct. 15, 1934 |